United States Patent [19]
Kirshenbaum et al.

[11] Patent Number: 5,918,235
[45] Date of Patent: Jun. 29, 1999

[54] OBJECT SURROGATE WITH ACTIVE COMPUTATION AND PROBABLISTIC COUNTER

[75] Inventors: Evan R. Kirshenbaum, Mountain View; Keith E. Moore, Santa Clara, both of Calif.

[73] Assignee: Hewlett-Packard Company, Palo Alto, Calif.

[21] Appl. No.: 08/833,158

[22] Filed: Apr. 4, 1997

[51] Int. Cl.$^6$ ........................................ G06F 17/30
[52] U.S. Cl. .................... 707/206; 707/3; 707/104; 395/682; 364/239
[58] Field of Search ...................... 707/206, 104, 707/103, 6, 8, 3; 711/170; 395/709, 685, 682, 703, 882, 187; 364/239, 245, 281; 345/347, 348, 352

[56] References Cited

U.S. PATENT DOCUMENTS

| | | | |
|---|---|---|---|
| 5,463,770 | 10/1995 | Todd | 707/206 |
| 5,481,708 | 1/1996 | Kukol | 395/709 |
| 5,548,749 | 8/1996 | Kroenke et al. | 707/206 |
| 5,754,841 | 5/1998 | Carino, Jr. | 707/3 |
| 5,802,367 | 9/1998 | Held et al. | 395/685 |

*Primary Examiner*—Wayne Amsbury
*Assistant Examiner*—Thu-Thao Havan

[57] ABSTRACT

To prevent dangling pointers, an object is annotated with a reference counted Object Surrogate which will outlive the object and which knows whether the referenced object is valid or not. Rather than directly referring to the underlying object, long lived external pointers (those which exist outside of an active computation) are maintained as pointers to the object surrogate. The object surrogate maintains a count of the number of active computations executing within the object. While there are active computations executing within the object, the object surrogate will not allow the object to be destroyed. The object may ask its surrogate to consider the object invalid to prevent new active computations from starting. This is done within the object's destructor. To allow an object to delete itself (potentially within an active computation) rather than deleting itself explicitly, the object requests of its object surrogate that the object be deleted when the number of active computations hits zero. In another technique, the active computation count comprises multiple counters. One of the multiple counters is selected pseudo-randomly and incremented when a new active computation begins executing on the object. A token referring to the selected counter is passed to the caller initiating the new computation. The token is passed back to the object surrogate to allow the appropriate counter to be decremented when the active computation completes. The count of active computations is considered to be zero only when all counters equal zero.

29 Claims, 5 Drawing Sheets

PROBABILISTIC COUNTER

OBJECT SURROGATE WITH ACTIVE COMPUTATION AND PROBABLISTIC COUNTER

BACKGROUND OF THE INVENTION

This invention relates generally to referencing objects in a programming environment and more specifically to an object surrogate that manages references and active computations on the object.

BACKGROUND

Two common problems which occur in object oriented programming languages such as C++, are memory leaks and dangling pointers. A memory leak occurs when memory space is allocated for an object but never released after use. A dangling pointer points to a destroyed object or freed memory region. After an object is dynamically destroyed, any subsequent attempt to reference the destroyed object using the dangling pointer can have unpredictable and often disastrous results. For instance, if a reference to a destroyed object is used, the memory space can become corrupt and potentially cause the computer program, and perhaps the computer itself, to crash. These problems become even more pronounced in multi-threaded applications, particularly applications where an object has "suicide" methods (methods where an object will delete itself).

It is difficult to dynamically determine whether a pointer or reference refers to a destroyed or invalid object. In the prior art, other programming languages use garbage collection to prevent memory leaks and dangling pointers. Garbage collection automatically reclaims any storage not referenced within the program. Such routines are unsuitable for C++ for several reasons. First, garbage collection is not an explicit feature of the C++ language and must therefore be implemented by a library or non-portable extension. As a stack based language, C++ is particularly unsuited to library-based garbage collection because of the inability to identify all currently active pointers. Second, effective garbage collection routines are difficult to write and tend to restrict objects to heap-based allocation which can introduce unacceptable memory and performance overhead.

Within the C++ language, one commonly used prior art technique for addressing the dangling pointer problem is to put the burden on the programmer to structure the logic of the program to avoid references to destroyed objects. This is extremely error-prone especially in multi-threaded applications.

Another prior art technique uses a reference count to keep track of existing references to each object. The reference count is updated whenever a pointer to the object is created, copied or deleted. When the reference count goes to zero, the object itself is deleted. Unfortunately, reference counting cannot be used to reclaim regions of memory formed by chains of objects forming circular dependencies. In addition, reference counted objects are generally restricted to be allocated on the heap.

Another prior art technique embeds a list of "backpointers" within each object. Each backpointer points to an external pointer which refers back to that object. When the object is destroyed, all references pointed to by the object's backpointer are invalidated. However, backpointers impose a large memory overhead and a substantial performance penalty.

In a multi-threaded environment, undefined program behavior can occur when an object is destroyed in one thread while another thread continues to reference the object. This situation is particularly problematic when the second referencing thread is executing within a method defined within the destroyed object. One prior art technique for solving this problem uses a mutual exclusion ("mutex") mechanism to ensure that only one thread of control at a time is executing within the object. Obviously this limits the amount of parallelism that can be achieved.

In multi-threaded environments, all of the foregoing mechanisms rely on mutual exclusion mechanisms for correctness. Locking and unlocking such mutexes (without underlying hardware support) can pose an unacceptable performance penalty in time-critical sections of code.

Accordingly, a need remains for a fast and efficient technique with low overhead for preventing dangling pointers while ensuring mutual exclusion in potentially multi-threaded environments.

SUMMARY OF THE INVENTION

To prevent dangling pointers, an object is annotated with a reference counted Object Surrogate which will outlive the object and which knows whether the referenced object is valid or not. Rather than directly referring to the underlying object, long lived external pointers (those which exist outside of an active computation) are maintained as pointers to the object surrogate.

The object surrogate maintains a count of the number of active computations executing within the object. While there are active computations executing within the object, the object surrogate will not allow the object to be destroyed. The object may ask its surrogate to consider the object invalid to prevent new active computations from starting. This is done within the object's destructor. To allow an object to delete itself (potentially within an active computation) rather than deleting itself explicitly, the object requests of its object surrogate that the object be deleted when the number of active computations hits zero.

Active computations are counted using techniques that ensure accurate results particularly in multi-threaded programming environments. One technique, uses a mutex to protect the active computation counter. This counter is incremented when an active computation begins executing on an object and is decremented when the active computation completes.

In another technique, the active computation count comprises multiple counters. One of the multiple counters is selected pseudo-randomly and incremented when a new active computation begins executing on the object. A token referring to the selected counter is passed to the caller initiating the new computation. The token is passed back to the object surrogate to allow the appropriate counter to be decremented when the active computation completes. The count of active computations is considered to be zero only when all counters equal zero.

In a variation of the previous technique, the counter that was decremented does not necessarily have to be the counter that was incremented. The counter can be chosen randomly or sequentially. The count of active computations is considered to be the sum of the multiple counters, any of which may be negative. An invariant on the object surrogate class ensures that such a sum will be accurate when it would be zero.

To ensure accurate tracking of the correct number of computations in the face of exceptions and returns, the maintenance of the count of active computations is encapsulated within the constructor and destructor of an object which is placed on the stack. C++ semantics ensure that the destructor is called (and the count decremented) when the enclosing block is exited.

The foregoing and other objects, features and advantages of the invention will become more readily apparent from the following detailed description of a preferred embodiment of the invention which proceeds with reference to the accompanying drawings.

DETAILED DESCRIPTION

Figure 1:
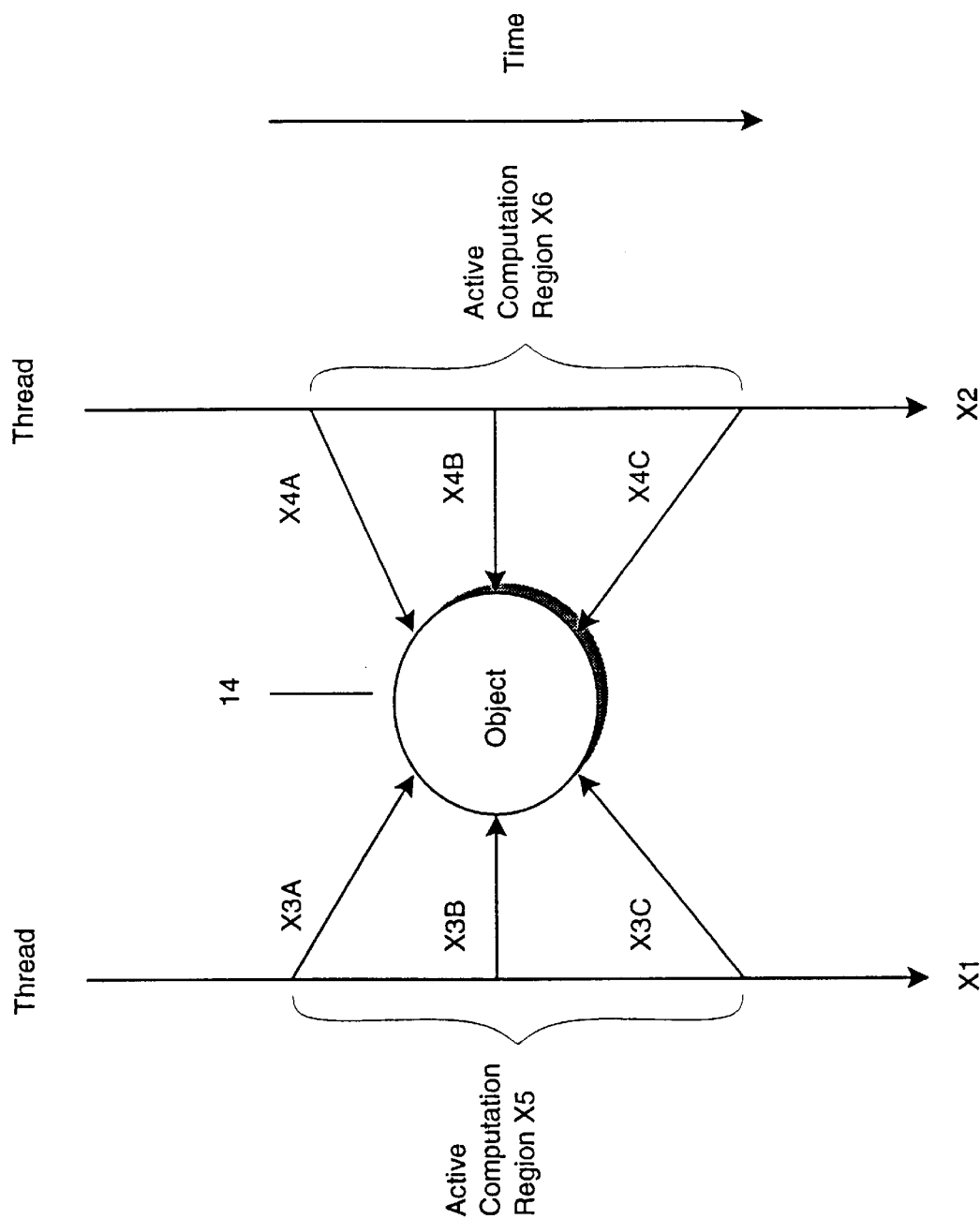
FIG. 1 is a temporal diagram showing the lifetime of an active computation.

Referring to FIG. 1, an active computation is a temporally bounded region (X5 or X6) of a thread of control (X1 or X2) relating to one or more uses (X3A–C or X4A–C) of an object 14. It is important that the object 14 not be destroyed within the active computation region X5 or X6.

Figure 2:
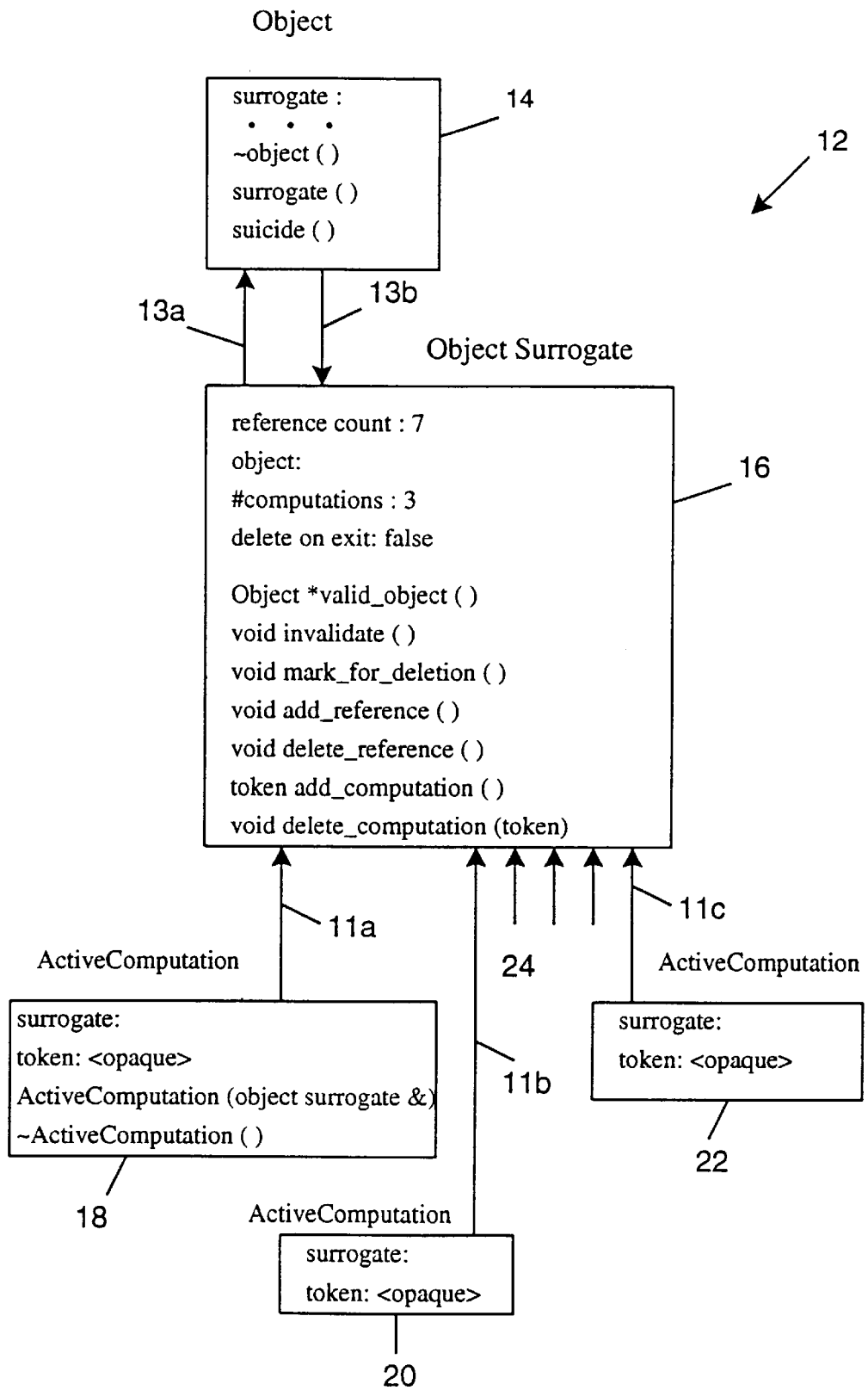
FIG. 2 is a schematic diagram showing the use of an object surrogate class in a programming environment according to the invention.
Figure 5:
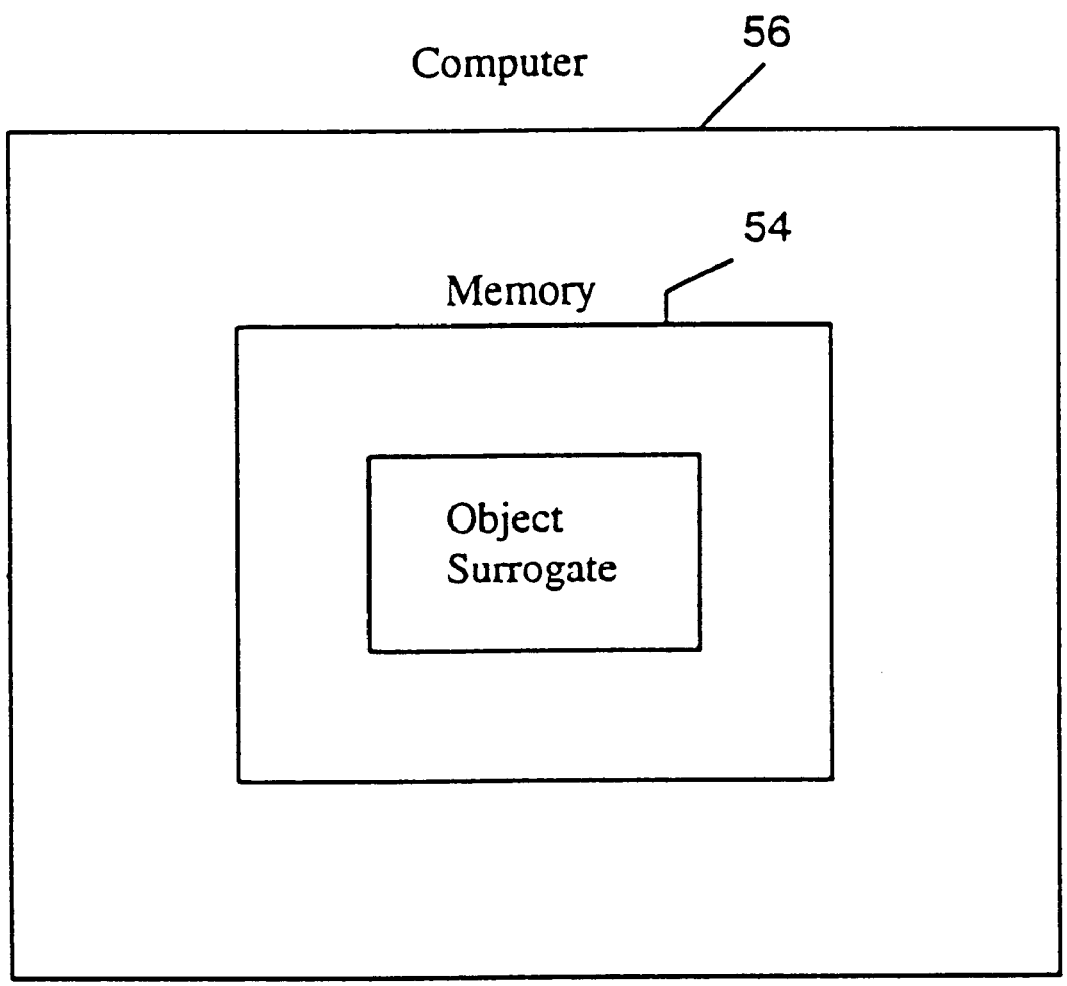
FIG. 5 is a block diagram of an object surrogate located in memory of a computer system.

FIG. 2 is a schematic diagram showing the use of an object surrogate class in a programming environment 12 according to the invention. Preferably, the programming environment 12 supports objects 14 (one shown in FIG. 1) such as in the C++ programming language, although other programming languages, especially object-oriented languages, would be equally suitable. The object surrogate class is loaded into a memory 54 of a computer system 56 (FIG. 5).

Each such object 14 is annotated with an instance of an object surrogate class 16 (hereinafter "object surrogate" or "surrogate") using a pointer 13b. Any reference 24 logically to the object 14 except those within an active computation X5 or X6 (FIG. 1) will instead refer to the object surrogate 16 (this includes references kept on a stack or in other data structures). Other references may also be given the privileged status of holding the direct reference, for example those which have explicit knowledge of the lifetime of the object. Such an optimization should be done with extreme care. In the preferred embodiment, an object's surrogate 16 is not created until an external reference to the object is required. This is strictly an optimization removing the need to create surrogates for objects that are never exposed.

The object surrogate 16 is a reference counted object. The count includes all references to the object surrogate including the one 13b from the object 14. It is important that this count be maintained correctly. In a multi-threaded program this may imply the use of a mutual-exclusion mechanism. Because the object surrogate 16 is reference counted, it is guaranteed to remain valid as long as there are any references to it.

The object surrogate 16 is a surrogate for a particular object 14 and holds a reference to that object as a pointer 13a. When the object becomes invalid, the object surrogate's 16 invalidate method is called and thereafter the object surrogate 16 is considered to not refer to any valid object.

It is important that the pointer 13a from the object surrogate 16 to its referenced object 14 is not considered a counted reference for purposes of determining the object's lifetime. If this were not the case, a circular reference would occur between the object surrogate 16 and the object 14 and neither would be deleted using normal reference counting semantics. One manner for controlling deletion of the object surrogate is by using a garbage collection routine.

When a thread of control X1 (FIG. 1) is within an active computation X5, the thread of control will need to make calls directly on an object 14. Within the region of active computation X5, the thread X1 may ask the object surrogate 16 for a pointer which refers directly to the object 14 by means of a valid_object( )method in the object surrogate.

If the object surrogate 16 refers to valid object 14 it will return a pointer 13a to the object 14 otherwise it will return a NULL pointer. In an alternative embodiment, instead of returning a NULL pointer an exception may be raised.

The object 14 presents an exposed interface which consists of a set of functions which may be invoked using the pointer to the object returned by the object surrogates valid_object( ) method.

If within an active computation X5, an object surrogate's 16 valid_object( ) method returned a non-null pointer to a valid object 14, it is important that said object is not destroyed before the end of the active computation X5. To guarantee this invariant, before the object's 14 destructor preforms any action (such as releasing memory or other resources) which would render the object incapable of supporting a function on an exposed interface. The object 14 must call its object surrogate's invalidate( ) method. This method will not return as long as there are any active computations currently executing on the object. This guarantees that during an active computation the pointer returned by valid_object( ) will not be a dangling pointer. This invariant allows objects 14 to be allocated on the stack. If the block enclosing a stack based object 14 is exited, the thread will block until all active computations X5 on the object are completed.

In order to determine when there are no active computations on an object 14, the object's surrogate 16 maintains a count of the number of active computations. This count (# computations in FIG. 2.) is incremented by a call to add_computation( ) and decremented by a call to delete_computation( ). To ensure that the count is maintained correctly even in the face of exceptions or returns, the existence of an active computation X5 is indicated by the lifetime of an ActiveComputation object (18,20,22). This ActiveComputation object maintains a reference to the object surrogate 16 and the ActiveComputation's (18,20,22) constructor and destructor call the surrogate's add_computation( ) and delete_computation( ) methods respectively. ActiveComputation objects (18,20,22) are normally instantiated on the stack. In this manner, normal C++ semantics can be used to guarantee that an active computation X5 is maintained from the creation of the ActiveComputation object (18,20,22) to the end of the enclosing block.

A particularly tricky case to handle in a multi-threaded system is that of an object which wants to destroy itself (in C++ this is done by calling delete this). If such a call were made in the system described above and the current thread was in an active computation X5 on the object 14 which is attempting to delete itself, this would lead to an immediate deadlock. The object's 14 destructor will call the surrogate's 16 invalidate( ) method. The invalidate( ) method will block until there are no active computations on the object 14.

However, since one of the active computations is the current blocked thread, the number of active computations will never reach zero.

To handle this situation, objects 14 are forbidden to delete themselves unless they can guarantee that the current thread is the only active computation (or there are no active computations on the object). Instead, of calling delete( ), the object calls its object surrogate's mark_for_delete( ) method. The mark_for delete( ) method will cause the object surrogate 16 to consider the object 14 it refers to as invalid. Note, this cannot be accomplished by calling the invalidate( ) method as this would lead to the deadlock which the mark_for_delete( ) method prevents. The object surrogate 16 also sets a flag within itself (delete_on_exit in FIG. 2). When the count of active computations reaches zero, if the delete_on_exit flag is set, the object 14 is deleted.

Figure 3:
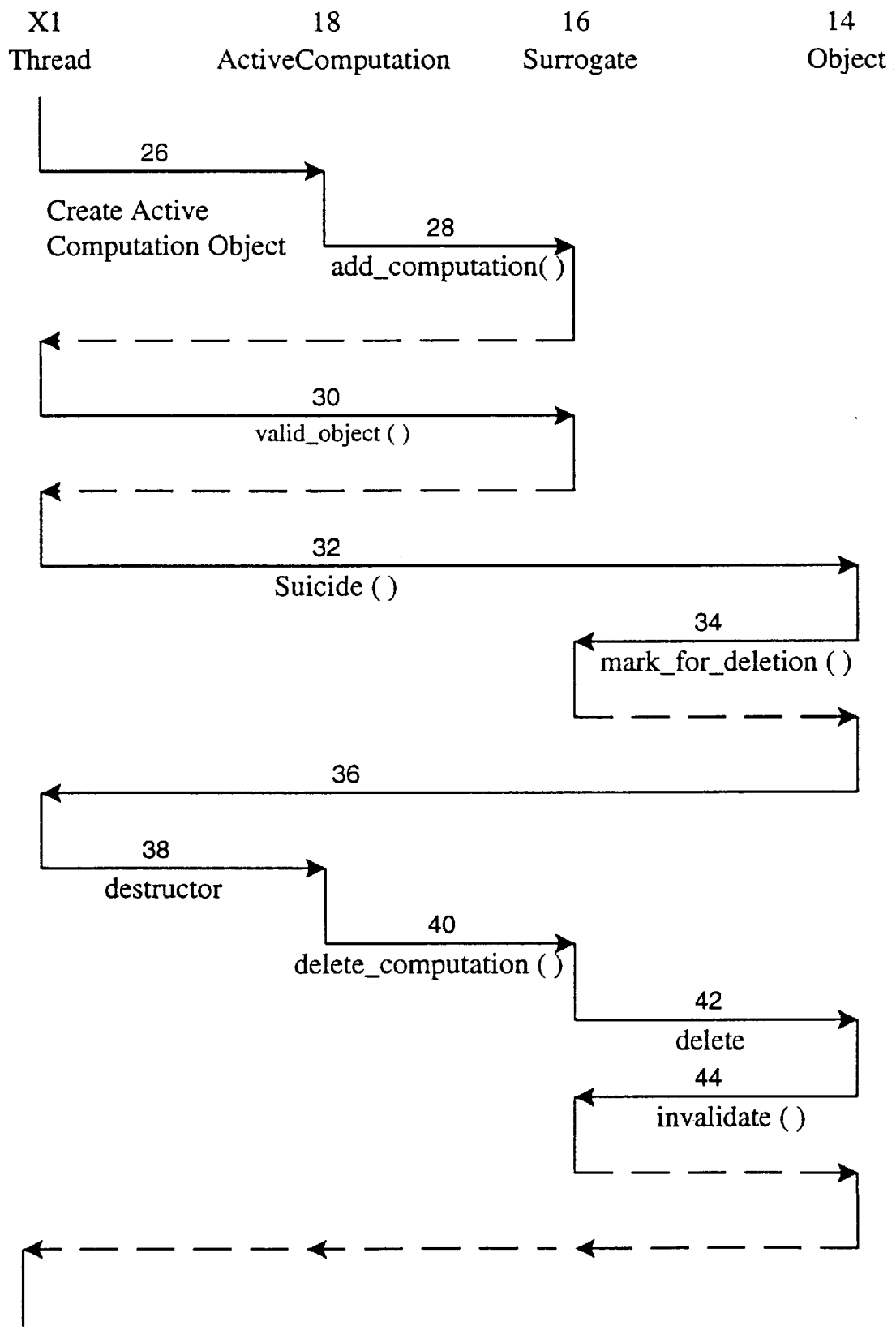
FIG. 3 is a use diagram showing the interactions of the components in a mark_for_delete invocation, according to the invention.

FIG. 3 shows a trace of a use of mark_for_deleteo within an active computation. In step 26, thread X I creates an ActiveComputation object 18 (FIG. 2) on the stack. In step 28, the ActiveComputation object's 18 constructor calls the surrogate's 16 add computation( ) method. The add_computation( ) method increments the number of active computations marking the beginning of an active computation X5 (FIG. 1). In step 30, sometime later, but within the lifetime of the ActiveComputation object 18 (i.e., the current block), thread X1 invokes the object surrogate's 16 valid_object( ) method which returns a pointer to the object 14. Step 32, still later, but again within the lifetime of the ActiveComputation object 18, thread X1 invokes a "suicide"( ) method in object 14. The suicide s method is an example of a method in which the object 14 will destroy itself. In step 34, within the suicide method, the object 14 calls its surrogate's 16 mark_for_delete( ) method. Since there is at least one active computation X5, the object 14 cannot be deleted yet.

Instead, the surrogate 16 records the request and returns. The implementation must ensure that a subsequent call to valid_object( ) will not return a pointer to the object 14. The "suicide( )" method then returns in step 36. In step 38, the block enclosing the ActiveComputation object 18 is exited. This causes the ActiveComputation's 18 destructor to fire which calls the surrogate's 16 delete_computation( ) method in step 40. This ends this active computation X5. Assuming this was the only active computation at this point, the surrogate's 16 count of active computations will now be zero. Since the object 14 had requested that it be deleted, the surrogate 16 will now do so in step 42 and clear its flag to ensure that the object is not deleted twice should another computation be created and destroyed. Deleting the object will invoke the object's destructor which in step 44 will call the surrogate's 16 invalidate( ) method. Since there are no active computations executing, the invalidate( ) method will return.

If there had been other active computations on the object 14 in step 40, then the count would not have gone to zero and the surrogate 16 would not have deleted the object 14. The deletion would be postponed until the final active computation had completed and the count had gone to zero.

In a multi-threaded environment correctness is dependent on the accuracy of the reference count and active computation count. Traditionally, such accuracy is achieved by bracketing the operations on the count with the lock and unlock of a mutual exclusion object. In practice, a mutex guarded counter may impose performance penalties which are unacceptable for some time-critical applications.

Figure 4:
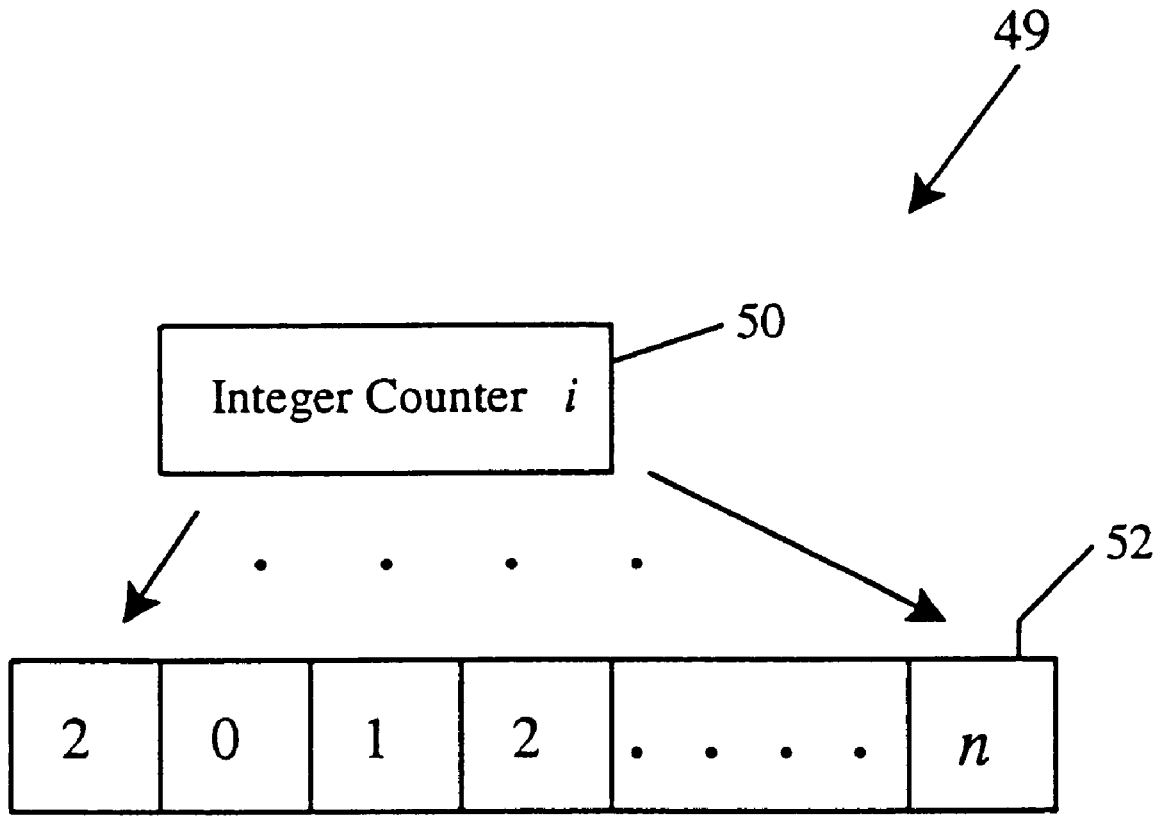
FIG. 4 is a schematic diagram of an index counter and multiple computation counters for tracking active computations on an object.

An alternative to a mutex guarded counter is a probabilistic counter. While this cannot guarantee that the count is accurate, the likelihood of it being inaccurate can be made arbitrarily small. In one embodiment, as shown in FIG. 4 a probabilistic 49 counter is implemented as an array 52 of non-negative integers (or equivalent data structures). These integers are initialized to zero. To increment the probabilistic counter, an index of the array is selected randomly (or pseudo- randomly) and the associated integer is incremented. The increment method returns to its caller an opaque token containing the index which was used. To decrement the probabilistic counter, the original token is handed back and the associated integer is decremented. The value of the probabilistic counter is considered the sum of the integers. In most multi-threaded environments, the sum cannot be performed atomically without requiring some additional mutual exclusion mechanism (which is what the probabilistic counter is trying to avoid).

For the purpose of maintaining an object's surrogate's 16 count of active computations X5, however, five simplifying assumptions can be made. First, the only requirement on the counter is that it be eventually detectable that it has hit zero. Second, the only time that the value of the counter is checked is on an invalidate( ) call or on a delete_computation( ) when the mark_for_delete flag has been set. Third, a thread X1 cannot request valid_object( ) until it has completed calling add_computation( ). Fourth, once the surrogate 16 has flagged its object 14 as invalid, the surrogate will never refer to a valid object again. Fifth, when mark_for_delete( ) and invalidate( ) are called, they first cause the surrogate 16 to consider its associated object invalid. These assumptions are sufficient to guarantee correctness in the absence of thread swap causing an incorrect addition in one of the underlying integers.

Consider the situation in which mark_for_delete( ) has previously been called on a surrogate 16. By assumption 3 and 4, threads which call valid_object( ) on this surrogate 16 will always receive a null pointer. If there is currently exactly one active computation X5, all but one of the integers will be zero and the remaining integer will have a value of 1. When delete_computation( ) is called, three situations must be considered. In scenario 1, the call to delete_computation( ) completes without an intervening add_computation( ). In this case, the summation of the integers within delete_computation( ) will discover that the integers are all zero and the object 14 will be deleted.

In scenario 2, during delete_computation( ), add_computation( ) is called by another thread X2 and the integer chosen to increment has not yet been considered as part of the sum being computed by the delete_computation( ). In this case, the delete_computation( ) will consider that there is still one active computation and will not consider the sum 0. Thus the object 14 will not deleted until this new computation X6 calls delete_computation( ).

In scenario 3, during delete_computation( ), another thread X2 calls add_computation( ) and the integer chosen to be incremented has already been considered in the summation in delete_computation( ). In this case, the count will be considered to be 0, and the object 14 will be deleted. This does not cause problems because given the assumptions (3 & 4) it is impossible for the new computation X6 to obtain a pointer to the deleted object 14. It is imperative, however, that the surrogate 16 be implemented to not attempt to delete the object 14 when this new computation concludes. This can be accomplished by clearing the mark_for_delete flag or clearing the pointer 13a.

In an alternative embodiment, the integers 52 need not be non-negative integers and the integer chosen for add_ computation( ) need not be the one decremented by delete_computation( ). In this embodiment, the token is unnecessary. For the probabilistic counter to be considered zero, it is not necessary for all of the integers to equal zero. It is sufficient that the integers sum to zero. This assumptions and discussion for the prior embodiment apply to this embodiment as well.

A third preferred embodiment, minimizes the risk of obtaining an incorrect count in the unlikely event that two simultaneous calls to add_computation( ) or delete_computation( ) chose to affect the same integer and there is a thread swap during an increment or decrement of the integer in both threads resulting in an incorrect value of the integer. This probability is extremely low; however, it can be improved. In this embodiment, rather than choosing the integer to increment or decrement randomly (or pseudo randomly) a separate non-guarded integer counter 50 is used to select the array indices sequentially. There are two cases to consider when two threads overlap in their calls to add_computation( ) or delete_computation( ). Scenario 1, a thread swap does not occur between the two threads while they are both incrementing the index counter. In this case, each thread will receive a different value from the index counter and therefore increment a different integer.

Scenario 2, a thread swap does occur between the two threads while they are both incrementing the index counter such that they both receive the same value. There are now two sub-cases to consider. In the first subcase, there is no thread swap between the two threads while they are both modifying the integer referenced by the index. In this case, the resulting value of the integer will correctly reflect both operations. In the second subcase, a second thread swap occurs between the two threads while both are modifying the integer referenced by the index.

In this case the resulting count will be incorrect, however, on most architectures, these two modifications will occur so close together that it is extraordinary unlikely that there would be two thread swaps within the amount of time and that the two threads would be synchronized so precisely as to cause this situation to occur. The assumptions and discussions in the first embodiment are equally applicable to this embodiment.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A method for using a computer to control a lifetime of an object, comprising the steps of:
    defining an object surrogate class comprising computer readable instructions stored in a memory of the computer for defining a class and including a reference to the object; and
    implementing a reference to the object by means of a reference to the object surrogate, wherein the object surrogate further comprises an invalidate( ) function comprising the step of considering the object invalid, wherein the object includes a reference to the object surrogate and a finalization routine comprising the step of calling the invalidate( ) function prior to performing any action which would render the object incapable of supporting an exposed interface of the object.

2. A method according to claim 1 further comprising the step of controlling the lifetime of the object surrogate by means of reference counting.

3. A method according to claim 1 further comprising the step of controlling the lifetime of the object surrogate by means of garbage collection.

4. A method according to claim 1 wherein the finalization routine is a destructor.

5. A method according to claim 1 wherein the object surrogate further includes a valid_object( ) function that returns a reference to the object only when the object surrogate considers the object valid.

6. A method according to claim 5 wherein the valid_object( ) function further comprises the step of returning a NULL pointer when the object surrogate considers the object invalid.

7. A method according to claim 5 wherein the valid_object( ) function further comprises the step of raising an exception when the object surrogate considers the object invalid.

8. A method according to claim 1 further comprising the step of preventing the object from being destroyed when there are active computations on the object.

9. A method according to claim 1 wherein the invalidate( ) function further comprises the step of blocking until there are no active computations on the object.

10. A method according to claim 1 wherein the object surrogate further includes a mechanism for tracking active computations on the object.

11. A method according to claim 10 wherein the mechanism for tracking active computations comprises an add_computation( ) function noting a start for one of the active computations and a delete_computation( ) function noting an end for one of the active computations.

12. A method according to claim 11 wherein:
    the mechanism for tracking active computations further includes a counter having a value reflecting the number of active computations;
    noting the start for one of the active computations is performed by incrementing the counter; and
    noting the end for one of the active computations is performed by decrementing the counter.

13. A method according to claim 12 wherein the counter includes:
    an array of elements each storing a count value;
    an increment function that selects an element of the array and increments the count value for the selected element;
    a decrement function that selects an element of the array and decrements the count value for the selected element; and
    a mechanism for computing a counter value by summing the count values of the elements of the array and returning the sum.

14. A method according to claim 11 including defining an ActiveComputation class having:
    an initialization function taking as an argument a reference to an instance of the object surrogate class, the initialization function comprising the steps of calling the add_computation( ) function of the argument and storing the reference to the instance of the object surrogate class; and
    a finalization function comprising the step of calling the delete computation function of the instance of the object surrogate class stored by the initialization function.

15. A method according to claim 14 wherein the finalization function is a destructor.

16. A method according to claim 14 wherein the initialization function is a constructor.

17. A method according to claim 1 wherein the object surrogate further includes a mark_for_delete( ) function comprising the steps of considering the object invalid and recording that the mark_for_delete( ) function has been called;

the method further comprising the step of deleting the object when the object surrogate has recorded that the mark_for_delete( ) function has been called and there are no active computations on the object.

18. A method according to claim 13 wherein the object calls the mark_for_delete( ) function whenever the object initiates self deletion.

19. A method for using a computer to probabalistically maintain a count in a multi-threaded computer system comprising:

defining a counter data type including an array of elements each storing a count value, the counter data type including:

an increment function comprising the steps of selecting an element of the array and incrementing the count value for the selected element;

a decrement function comprising the steps of selecting an element of the array and decrementing the count value for the selected element;

a mechanism for computing the value of the counter comprising the steps of summing the count values of the elements of the array and returning a sum;

the method further comprising the steps of incrementing the counter by calling the increment function and decrementing the counter by calling the decrement function.

20. A method according to claim 19 wherein the step of selecting the element of the array within the increment function comprises the step of computing a pseudo-random number.

21. A method according to claim 19 wherein the step of selecting the element of the array within the decrement function comprises the step of computing a pseudo-random number.

22. A method according to claim 20 wherein the increment function further comprises the step of returning a token indicating the selected element and the decrement function includes a parameter capable of accepting a token returned from a call to the increment function; and the step of selecting the element of the array within the decrement function is implemented by choosing the element indicated by the parameter.

23. A method according to claim 19 wherein the counter data type further includes an indexing mechanism which selects elements of the array sequentially; and the steps of selecting the element of the array within the increment and decrement functions comprise the step of using the indexing mechanism.

24. A computer readable storage medium for encoding program code for controlling a lifetime of an object, comprising:

an object surrogate class comprising computer readable instructions stored in a memory of the computer for defining a class and including a reference to the object; and instructions for performing the storage of a reference to the object by storing a reference to the object surrogate, wherein the object surrogate class further comprises an invalidate( ) function, the storage medium further comprising instructions for performing the invalidate( ) function on the object surrogate class by considering the object invalid and blocking until there are no active computations on the object.

25. A storage medium according to claim 24 wherein the object surrogate class further includes an add_computation( ) function and a delete_computation( ) function, the storage medium further comprising instructions for performing the add_computation( ) function noting a start of an active computation and instructions for performing a delete_computation( ) function noting an end of the active computation.

26. A storage medium according to claim 24 wherein the object surrogate further includes a mark_for_delete( ) function, the storage medium further comprising:

instructions for performing the mark_for_delete( ) function by considering the object invalid and recording that the mark_for_delete( ) function has been called; and instructions for deleting the object when the object surrogate has recorded that the mark_for_delete( ) function has been called and there are no active computations on the object.

27. A computer readable storage medium for encoding program code and probabalistically maintaining a count in a multi-threaded computer system comprising:

a counter data type including an array of elements each capable of storing a count value, an increment function, a decrement function, and a mechanism for computing the value of the counters;

instructions for performing the increment function by selecting an element of the array and incrementing the selected element count value;

instructions for performing the decrement function by selecting an element of the array and decrementing the selected element count value; and instructions for computing a value of the counter by summing the count values of the elements of the array and returning a sum.

28. A storage mechanism according to claim 27 further comprising instructions for selecting the element of the array within the increment function by computing a pseudo-random number.

29. A storage mechanism according to claim 27 wherein the counter data type further includes an indexing mechanism, the storage mechanism further comprising:

instructions for implementing the indexing mechanism to select the elements of the array sequentially; and instructions for implementing the selection of the element of the array within the increment and decrement functions by using the indexing mechanism.

* * * * *